US011941240B1

(12) United States Patent
Nguessan et al.

(10) Patent No.: US 11,941,240 B1
(45) Date of Patent: Mar. 26, 2024

(54) REAL-TIME VIDEO DISCOVERY-FRIENDLY USER EXPERIENCE FOR MOBILE DEVICES

(71) Applicant: Google LLC, Mountain View, CA (US)

(72) Inventors: Olayinka Sylvia Nguessan, San Francisco, CA (US); Samuel Edward Russell, Jr., San Francisco, CA (US); Christopher Griffin, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/086,568

(22) Filed: Dec. 21, 2022

(51) Int. Cl.
*G06F 3/0485* (2022.01)
*G06F 3/04817* (2022.01)
*G06F 3/04842* (2022.01)
*G06F 16/738* (2019.01)
*G06F 16/74* (2019.01)

(52) U.S. Cl.
CPC ........ *G06F 3/0485* (2013.01); *G06F 3/04817* (2013.01); *G06F 3/04842* (2013.01); *G06F 16/738* (2019.01); *G06F 16/743* (2019.01); *G06F 2203/04803* (2013.01)

(58) Field of Classification Search
CPC .............. G06F 3/0485; G06F 3/04817; G06F 3/04842; G06F 16/738; G06F 16/743; G06F 2203/04803
See application file for complete search history.

(56) References Cited

U.S. PATENT DOCUMENTS

| 2007/0074115 | A1* | 3/2007 | Patten | G11B 27/032 |
| 2009/0019062 | A1* | 1/2009 | Saba | G06Q 10/107 |
| 2014/0089802 | A1* | 3/2014 | Wang | H04N 21/482 |
| | | | | 715/719 |
| 2018/0014037 | A1 | 1/2018 | Venkatraman | |
| 2018/0316940 | A1 | 11/2018 | Todd | |
| 2019/0146651 | A1 | 5/2019 | Williams | |

FOREIGN PATENT DOCUMENTS

WO 2022048435 A1 3/2022

* cited by examiner

*Primary Examiner* — Pei Yong Weng
(74) *Attorney, Agent, or Firm* — Lowenstein Sandler LLP

(57) ABSTRACT

A plurality of video items comprising a first subset of video items and a second subset of video items are received at a client device. A graphical user interface comprising a scrollable area to present the plurality of video items and a focus area to present one of the plurality of video items is presented. Video items of the second subset of video items are presented in or adjacent to the focus area when the first subset of video items is visible in the scrollable area and prior to the second subset of video items becoming visible in the scrollable area, and a size of the video items from the second subset of video items presented in or adjacent to the focus area is smaller than a size of video items of the first subset of video items presented in the scrollable area.

24 Claims, 10 Drawing Sheets

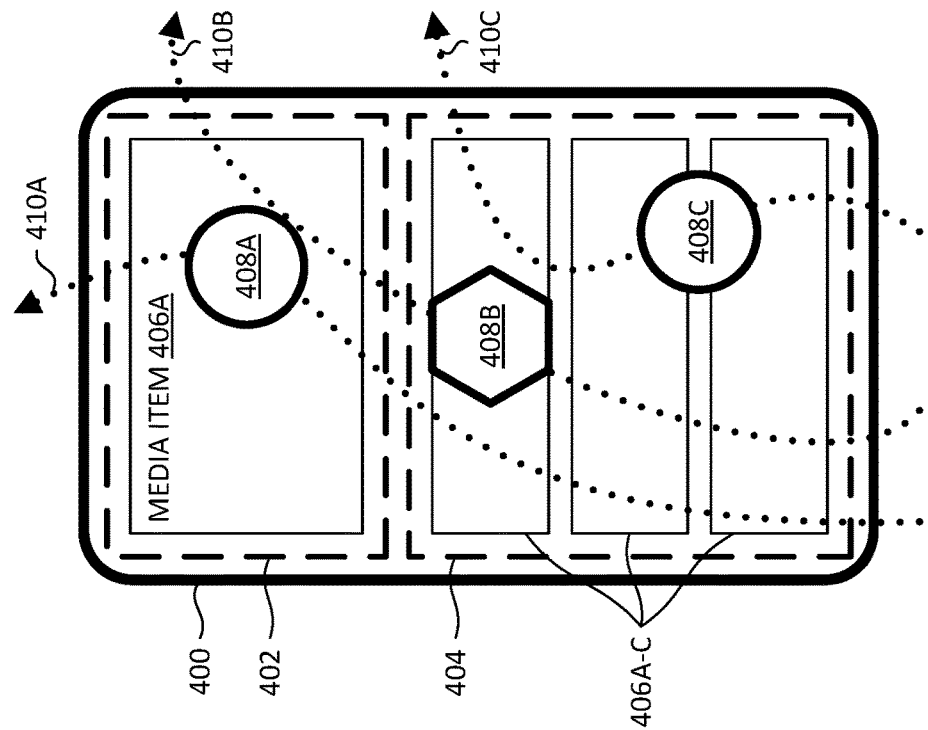
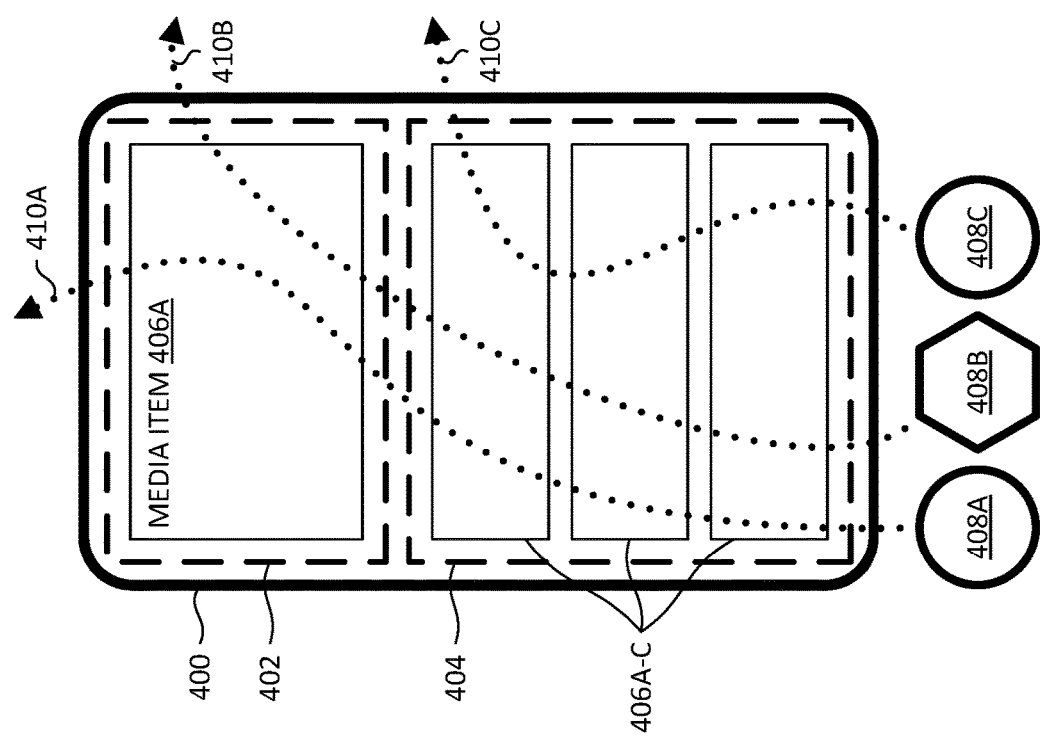
FIG. 4B
FIG. 4A

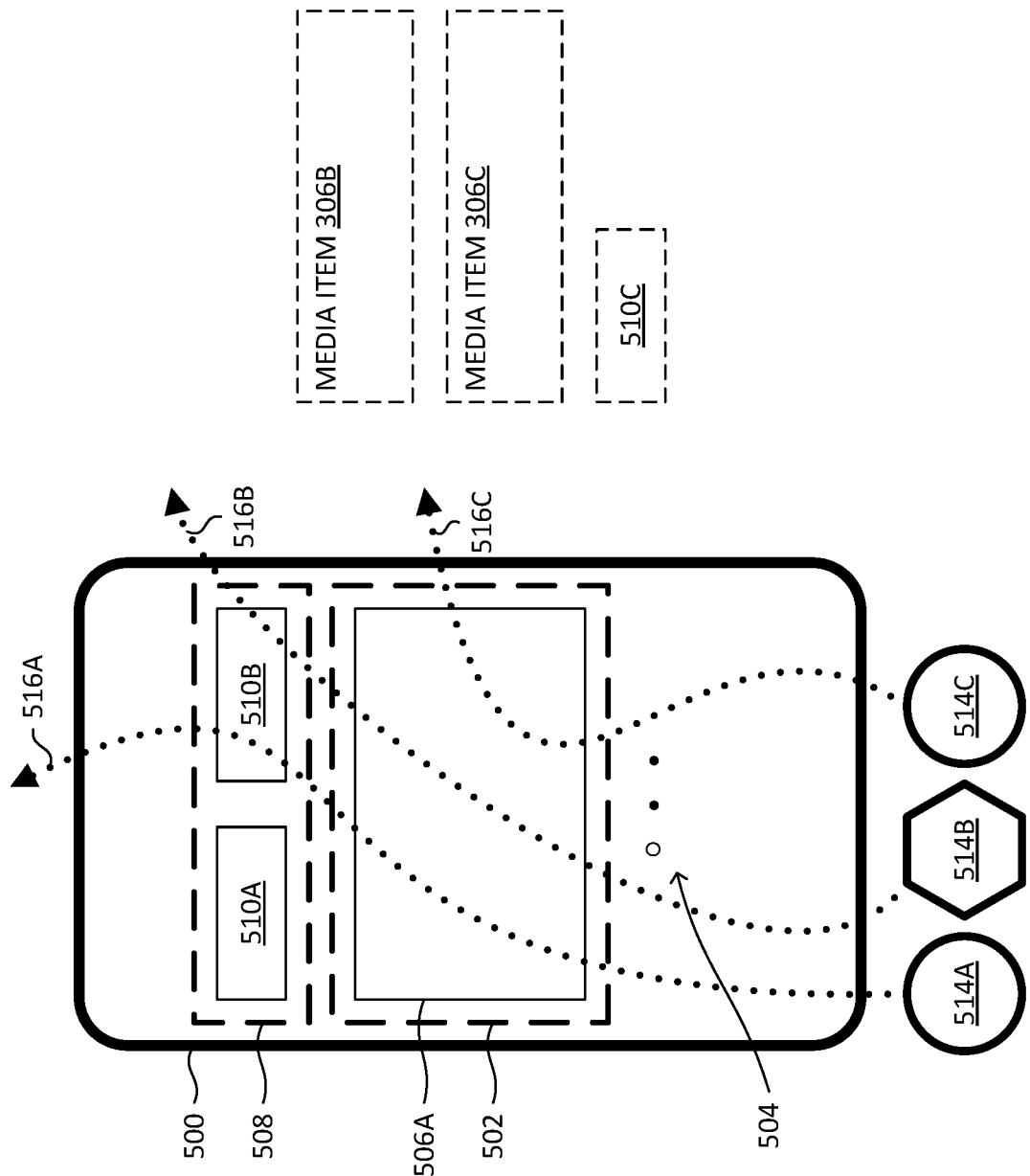

REAL-TIME VIDEO DISCOVERY-FRIENDLY USER EXPERIENCE FOR MOBILE DEVICES

TECHNICAL FIELD

Aspects and implementations of the present disclosure relate to media content, and in particular to providing user experiences conducive to discovery of an increased number of videos.

BACKGROUND

A platform (e.g., a multimedia content platform) can identify and transmit media items to client devices connected to the platform via a network. A media item can include a video item and/or an audio item, in some instances. Users can consume the transmitted media items via a user interface (UI) provided by the platform. In some instances, newly recommended media items or some media items resulting from a search query may be difficult or tedious for the user to discover. This may be due in part to limited screen real estate on mobile devices, tedious and repetitive navigation experiences, and a lack of user awareness of new media items being loaded on client devices.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In some implementations, a system and method are disclosed for real-time video item-friendly user experiences for mobile devices. In an implementation, a method includes receiving, at a client device, a plurality of video items comprising a first subset of video items and a second subset of video items. The method further includes presenting, at the client device, a graphical user interface (GUI) comprising a first scrollable area to present the plurality of video items and a focus area to present a video item corresponding to one of the plurality of video items. The method further includes presenting, in the GUI on the client device, video items of the second subset of video items in or adjacent to the focus area. The video items of the second subset of video items are presented in or adjacent to the focus area when the first subset of video items is visible in the first scrollable area and prior to the second subset of video items becoming visible in the first scrollable area. A size of the video items from the second subset of video items presented in or adjacent to the focus area is smaller than a size of video items of the first subset of video items presented in the first scrollable area.

In some embodiments, the video items from the second subset of video items are presented as floatable elements. The floatable elements may each comprise an icon representing a corresponding video item. Each floatable element may transit along a path across a portion of the focus area from a starting position to an ending position. The icon representing the corresponding video item is one of a video thumbnail, a creator avatar, or a channel icon. The floatable elements may each travel at a variable speed.

In some embodiments, the video items from the second subset of video items are presented as chip elements in a second scrollable area adjacent to the focus area. The chip elements may each comprise an icon representing a corresponding video item. The plurality of video items may be ordered using a first order, and the chip elements may be presented in the second scrollable area in a second order. The second order may correspond to the first order.

In some embodiments, a method further includes receiving, at the client device, an updated plurality of video items, and initiating a notification animation associated with chip elements.

In some embodiments, a method further includes receiving, at the client device, a user input indicating a selection of video items of the second subset of video items presented in or adjacent to the focus area. The method further includes causing the selected video item to become visible in the first scrollable area and causing the selected video item to be presented in the focus area.

In some embodiments a computer-readable storage medium (which may be non-transitory computer-readable storage medium, although the invention is not limited to that) stores instructions which, when executed, cause a processing device to perform operations comprising a method according to any embodiment or aspect described herein.

In some embodiments a system comprises: a memory; and a processing device operatively coupled with the memory to perform operations comprising a method according to any embodiment or aspect described herein.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIGS. 4A-C illustrate an example component viewer GUI with additional GUI elements to facilitate real-time media discovery-friendly user experiences, in accordance with at least one embodiment of the present disclosure.

FIGS. 5A-C illustrate an example component viewer GUI with additional GUI elements to facilitate real-time media discovery-friendly user experiences, in accordance with at least one embodiment of the present disclosure.

DETAILED DESCRIPTION

Figure 1:
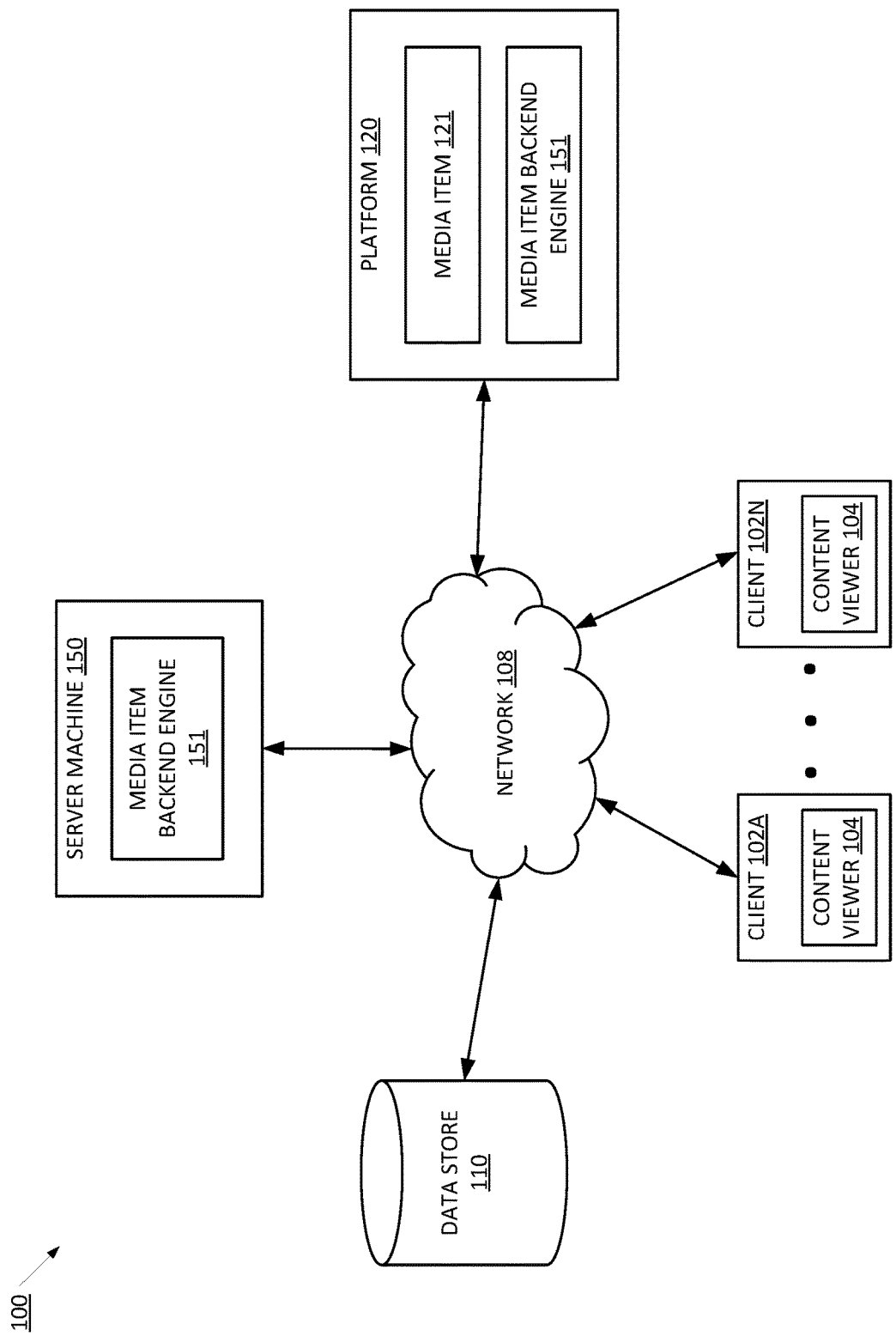
FIG. 1 illustrates an example system architecture, in accordance with at least one embodiment of the present disclosure.

Aspects of the present disclosure relate to providing user experiences conducive to discovery of an increased number of media items on user devices (e.g., mobile and other user devices). An example media platform may include a real-time media recommendation system that communicates with a mobile device to present media items to a user of the mobile device. For example, a user interface displayed by a mobile application or a web browser on a mobile device may include a scrollable area that holds media items or media recommendations loaded from a server of the media platform and a focus area to present and/or play a media item to a user. The scrollable area may display a subset of the media recommendations and provide a navigation experience to enable the user to change the displayed subset of media recommendations, thus causing other media recommendations to become visible in the scrollable area. In some instances, the navigation experience may be a scrolling or swiping experience. The scrollable area may also receive input from the user to engage with one or more of the media recommendations. For example, a user may tap on a media recommendation to begin playing a corresponding media item (e.g., in a focus area or in a full-screen view). The media recommendation system may include, for example, a machine learning recommendation engine that can process various inputs to provide media recommendations for the user, which may then be loaded in the scrollable area and/or focus area of the user interface for presentation to the user. The inputs may include, for example, the user's viewing history and preferences, current trends associated with multiple users, suggestions from marketing and advertising partners, and similar. Video platforms are used as example media platforms herein, but similar features may be present in other multimedia or streaming platforms, such as a music streaming platform.

In conventional systems, a media recommendation system may initially transfer one or more media recommendations to a mobile device to populate a scrollable area upon initial engagement with the user. For example, the user may open the media platform's application on their mobile device and the recommendation system may immediately transfer enough media recommendations to fill the visible portion of the scrollable area of a homepage user interface (UI). A small number of media recommendations may be initially transferred to provide a responsive user interface and reduce latency in populating the initial media recommendations (e.g., due to a slow network connection). Subsequently, the media recommendation system may transfer additional media recommendations that are loaded to the scrollable area or to a buffer, index, or database on the mobile device. The number of additional media recommendations that are loaded may depend on a variety of factors. For example, available network bandwidth or device memory may limit how quickly or how many additional media recommendations are loaded. Additional media recommendations may also be transferred and loaded in response to user navigation activity, such as the user scrolling near the end of the currently available recommendations in the scrollable area, necessitating that more media recommendations be loaded to provide continuity in the user experience. The time between loading additional media recommendations may vary. For example, media recommendations may load as fast as the network allows, or media recommendations may not load for several minutes until the user navigates to certain position in the scrollable area. The media recommendation system may transfer additional media recommendations silently and invisibly in the background such that the user is unaware of additional media recommendations being loaded. The media recommendation system may also provide an indication that additional media recommendations are being loaded. For example, a UI spinner at the bottom of a scrollable area may indicate that more media recommendations are about to be loaded.

In another example, conventional systems may transfer one or more search results to a mobile device in response to a search query provided by the user. The search results may comprise a plurality of media items relevant to the user's query. As with the previous example, one or more media items may be initially transferred to populate the visible portion of a scrollable area for the search results. Subsequent search results may be transferred at later times as described above.

Users may miss out on discovering new content in the systems described above. For example, daily active users may not bother navigating through the homepage scrollable area and thus may not be exposed to the invisible recommendations loaded in the hidden portion of the scrollable area or in a buffer, index, or database on the mobile device. Similarly, users may not bother navigating through a scrollable area of search results. Users may find that the navigation experience is time-consuming, tedious, or repetitive, and may not wish to engage with the scrollable area on a regular basis as a result. Furthermore, users may not even be aware that additional media recommendations or search results are being loaded in the background, given the unobtrusive and asynchronous nature of some of the recommendation-loading processes described above. While additional UI elements (e.g., a UI spinner) might be added to the homepage user interface to notify the user that additional media recommendations are being loaded, the small form-factor of mobile devices and limited UI real estate may not be able to accommodate these additional elements. For example, it might be more practical to dedicate free real estate to additional content rather than a loading indicator for a scrollable area. These factors alone or in combination may contribute to user boredom or loss of interest in the media platform and may also limit the media platform's ability to quickly and effectively disseminate new and interesting content to its users. These factors may also contribute to wasted computing time and resources and increased latency on user devices, platform servers, and networks due to the storage and processing of many media items and recommendations that are not being consumed by users.

Even if a user engages with the scrollable area and navigates to view some of the media items that were not previously visible, some of the media items may be stale or no longer relevant to the user's current interests. For example, several recommendations loaded in the background may consist of videos related to the user's viewing history of cooking videos, cat videos, and music videos. However, if the user is only engaging with the cooking videos in the scrollable area, the other recommendations may be uninteresting to the user at the moment. In combination with the factors described above, stale media items may further contribute to wasted computing time and resources and increased latency on user devices and may further deter the user from engaging with the platform and discovering new content.

Aspects of the present disclosure address the above and other deficiencies by implementing techniques that facilitate user experiences conducive to discovery of an increased number of videos on user devices. User experiences may include transient UI elements representing newly loaded media items, which may notify the user of new media items and simplify navigating the scrollable area. User experiences may also include UI elements providing an auxiliary navigation experience, which may provide similar benefits. A media platform may include a backend engine, such as a machine learning recommendation engine or a search engine, interacting with a user device (e.g., a mobile application or a web browser) to provide new and updated media items.

In at least one embodiment, a user experience including floatable UI elements is provided. Newly loaded media items may trigger the creation of one or more floatable elements. Each floatable element may represent one of the newly loaded media items and may depict a thumbnail, a creator photo or avatar, a channel icon, or other information associated with the corresponding media item. Floatable elements may be of various shapes and sizes. Floatable elements may begin at starting positions on- or off-screen and transit (e.g., animate) across a portion of the user interface following one or more paths at one or more speeds to ending positions on- or off-screen. The user may interact with the floatable elements using a variety of gestures including taps, long-presses, swipes, and similar. User interactions may result in the corresponding media item being played (e.g., in the scrollable area or in a focus area), the floatable element being dismissed, or a variety of other actions. Floatable elements may improve the user navigation experience by, for example, automatically scrolling the scrollable area to the media item corresponding to the floatable element the user interacted with. The transient nature of floatable elements does not require dedicated UI real estate because the floatable elements may temporarily float over and cover existing UI elements (e.g., the scrollable area or focus area) without substantially impairing the UI. Furthermore, the appearance and movement of the floatable element alerts the user to otherwise invisible items in a way that may be enjoyable to the user.

In at least one embodiment, a user experience including chip UI elements is provided. A secondary scrollable area UI element may include one or more chip elements, each chip element corresponding to one of the media items in the main scrollable area, and the chip elements may be identically ordered with respect to the corresponding media items in the main scrollable area. The secondary scrollable area and chip elements may be of various shapes and sizes. For example, the secondary scrollable area may be a shelf with rectangular chip elements depicting thumbnails of the corresponding media items horizontally stacked within the shelf. The user may interact with the chip elements using a variety of gestures, and interactions may be associated with a variety of responses as described with respect to the floatable elements. For example, tapping a chip element in the secondary scrollable area may automatically scroll the main scrollable area to the corresponding media item and begin playing the media item. Furthermore, the chip elements may animate to alert the user that more items have been loaded.

The secondary scrollable area's navigation experience may be similar to or different than the main scrollable area's navigation experience and may provide faster and less tedious navigation than the main scrollable area. For example, the main scrollable area's navigation experience may involve swiping (e.g., one swipe per media item to navigate between media items) and the secondary scrollable area's navigation experience may involve vertical or horizontal scrolling (e.g., one scrolling gesture reveals multiple recommendations). The navigation experiences of the secondary scrollable area and main scrollable area may be synchronized or may be independent. The secondary scrollable area may be positioned near the main scrollable area or focus area on the user interface. In at least one embodiment, the secondary scrollable area may be dismissed, folded, minimized, or similar based on user interaction. In at least one embodiment, a secondary scrollable area with chip elements may be combined with floatable elements.

Aspects and embodiments of the present disclosure may enable the media system to respond to user interaction with the disclosed and other user experiences and provide new or updated media items. Once the user interacts with one of the floatable elements or chip elements, a signal may be sent to the backend engine to identify the media item the user has interacted with and/or the type of interaction. For example, the user tapping a floatable element and engaging with the associated media item may be a positive interaction, while the user swiping a floatable element to dismiss it may be a negative interaction. The backend engine may update previous media items or produce new media items as a result of the interaction. For example, an updated media item may result in the main scrollable area reordering, deleting, or adding media items in a previously loaded set of items. These updates may prevent old media items from becoming stale based on the user's current engagement patterns. New media items may be used to configure future sets of media items that have not yet been loaded on the user device or in the scrollable area.

Accordingly, aspects and embodiments of the present disclosure foster a real-time dialog between the user and the backend engine and provide user experiences enabling easy navigation and discovery of new content. As a result, users may experience increased enjoyment and curiosity while using the media platform and spend less time navigating content. Users may also be more aware of newly loaded content, and recommendations or search results may be more frequently refreshed to remain relevant to the user based on their engagement patterns. These advantages may improve overall platform efficiency by reducing the average computing resources and network bandwidth consumed per successful recommendation or search result (e.g., per media recommendation or search result the user consumes). Screen real estate on mobile and similar devices is also used more efficiently by the provided user experiences. The above advantages may also increase the time users spend meaningfully engaging with the platform and improve user retention. These benefits may extend to content creators and other platform partners by improving dissemination of new content and by increasing and diversifying viewership. Thus, user and partner trust in the media platform may be improved as a result of the techniques provided herein.

FIG. 1 illustrates an example system architecture 100, in accordance with implementations of the present disclosure. The system architecture 100 (also referred to as "system" herein) includes client devices 102A-N, a data store 110, a platform 120, and/or a server machine 150 each connected to a network 108. In implementations, network 108 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. In some embodiments, a data item can correspond to one or more portions of a document, multimedia content (e.g., a video), and/or a file displayed via a graphical user interface (GUI) on a client device 102, in accordance with embodiments described herein. Data store 110 can be hosted by one or more storage devices, such as main memory, magnetic or optical storage-based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by platform 120 or one or more different machines coupled to the platform 120 via network 108.

The client devices 102A-N can each include computing devices such as personal computers (PCs), laptops, mobile phones, smart phones, tablet computers, netbook computers, network-connected televisions, etc. In some implementations, client devices 102A-N may also be referred to as "user devices." Client devices 102A-N can include a content viewer such as content viewer 104. In some implementations, content viewer 104 can be an application that provides a user interface (UI) for users to view or upload content, such as images, video items, web pages, documents, etc. For example, content viewer 104 can be a web browser that can access, retrieve, present, and/or navigate content (e.g., web pages such as Hyper Text Markup Language (HTML) pages, digital media items, etc.) served by a web server. Content viewer 104 can render, display, and/or present the content to a user. Content viewer 104 can also include an embedded media player (e.g., a Flash® player or an HTML5 player) that is embedded in a web page (e.g., a web page that may provide information about a product sold by an online merchant). In another example, content viewer 104 can be a standalone application (e.g., a mobile application or app) that allows users to view digital media items (e.g., digital video items, digital images, electronic books, etc.). According to aspects of the disclosure, content viewer 104 can be a content platform application for users to view content provided by platform 120. As such, content viewer(s) 104 and/or the UI associated with content viewer 104 can be provided to client devices 102A-N by platform 120. In one example, content viewers 104 may be embedded media players that are embedded in web pages provided by the platform 120.

A media item 121 can be consumed via the Internet or via a mobile device application, such as content viewer 104 of client devices 102A-N. In some embodiments, a media item 121 can correspond to a media file (e.g., a video file, an audio file, a video stream, an audio stream, etc.). In other or similar embodiments, a media item 121 can correspond to a portion of a media file (e.g., a portion or a chunk of a video file, an audio file, etc.). As discussed previously, a media item 121 can be requested for presentation to the user by the user of the platform 120. As used herein, "media," "media item," "multimedia item," "online media item," "digital media," "digital media item," "content," "multimedia content," and "content item" can include an electronic file that can be executed or loaded using software, firmware or hardware configured to present the digital media item to an entity. As indicated above, the platform 120 can store the media items 121, or references to the media items 121, using the data store 110, in at least one implementation. In another implementation, the platform 120 can store media item 121 or fingerprints as electronic files in one or more formats using data store 110. Platform 120 can provide media item 121 to a user associated with a client device 102A-N by allowing access to media item 121 (e.g., via a content platform application), transmitting the media item 121 to the client device 102, and/or presenting or permitting presentation of the media item 121 via client device 102.

In some embodiments, media item 121 can be a video item. A video item refers to a set of sequential video frames (e.g., image frames) representing a scene in motion. For example, a series of sequential video frames can be captured continuously or later reconstructed to produce animation. Video items can be provided in various formats including, but not limited to, analog, digital, two-dimensional and three-dimensional video. Further, video items can include movies, video clips, video streams, or any set of images (e.g., animated images, non-animated images, etc.) to be displayed in sequence. In some embodiments, a video item can be stored (e.g., at data store 110) as a video file that includes a video component and an audio component. The video component can include video data that corresponds to one or more sequential video frames of the video item. The audio component can include audio data that corresponds to the video data.

In some embodiments, media item 121 may be representative of a particular media content. For example, media item 121 may include a thumbnail representing a video (e.g., a representative frame or cover art), as well as the video title, author, or other metadata. Representative media item 121 may also include a preview of the particular media content, such as a short video or animation (e.g., GIF) of several frames extracted from a longer video or an audio clip extracted from a full-length song. In at least one embodiment, representative media items are automatically created at platform 120. For example, representative media items comprising thumbnails and titles may be created for all videos on platform 120 and stored on data store 110. Representative media items may later be transferred to a client device (e.g., client device 102A-N). In at least one embodiment, a client device (e.g., client device 102A-N) automatically creates representative media items locally. For example, after retrieving all or part of a particular media content from platform 120, the client device may extract a representative frame and create a representative media item that includes the frame as a thumbnail along with the title and author.

Platform 120 can include multiple channels (e.g., channels A through Z). A channel can include one or more media items 121 available from a common source or media items 121 having a common topic, theme, or substance. Media item 121 can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking," "following," "friending," and so on.

In some embodiments, system 100 can include one or more third-party platforms (not shown). In some embodiments, a third-party platform can provide other services associated media items 121. For example, a third-party platform can include an advertisement platform that can provide video and/or audio advertisements. In another example, a third-party platform can be a video streaming service provider that produces a media streaming service via a communication application for users to play videos, TV shows, video clips, audio, audio clips, and movies, on client devices 102 via the third-party platform.

In some embodiments, a client device 102 can transmit a request to platform 120 for access to a media item 121. Platform 120 may identify the media item 121 of the request (e.g., at data store 110, etc.) and may provide access to the media item 121 via the UI of content viewer 104 provided by platform 120. In some embodiments, the requested media item 121 may have been generated by another client device 102 connected to platform 120. For example, client device 102A can generate a video item (e.g., via an audiovisual component, such as a camera, of client device 102A) and provide the generated video item to platform 120 (e.g., via network 108) to be accessible by other users of the platform. In other or similar embodiments, the requested media item 121 may have been generated using another device (e.g., that is separate or distinct from client device 102A) and transmitted to client device 102A (e.g., via a network, via a bus, etc.). Client device 102A can provide the video item to platform 120 (e.g., via network 108) to be accessible by other users of the platform, as described above. Another client device, such as client device 102N, can transmit the request to platform 120 (e.g., via network 108) to access the video item provided by client device 102A, in accordance with the previously provided examples.

In some embodiments, the UI of content viewer 104 provided by platform 120 (referred to simply as platform UI herein) may include one or more UI elements that enable a user to control a playback of the media item 121 via content viewer 104. For example, the platform UI may include one or more UI elements that enable the user to initiate playback of the media item 121 (e.g., a "play" button) and/or pause playback of the media item 121 (e.g., a "pause" button). In another example, the platform UI may include one or more UI elements that enable the user to initiate playback of another media item 121 that is related to the requested media item 121 (e.g., a "next" button). The platform UI may further include one or more UI elements that indicates a timeline of the media item 121 and/or a progress of the playback of the media item 121 within the timeline.

Figure 3B:
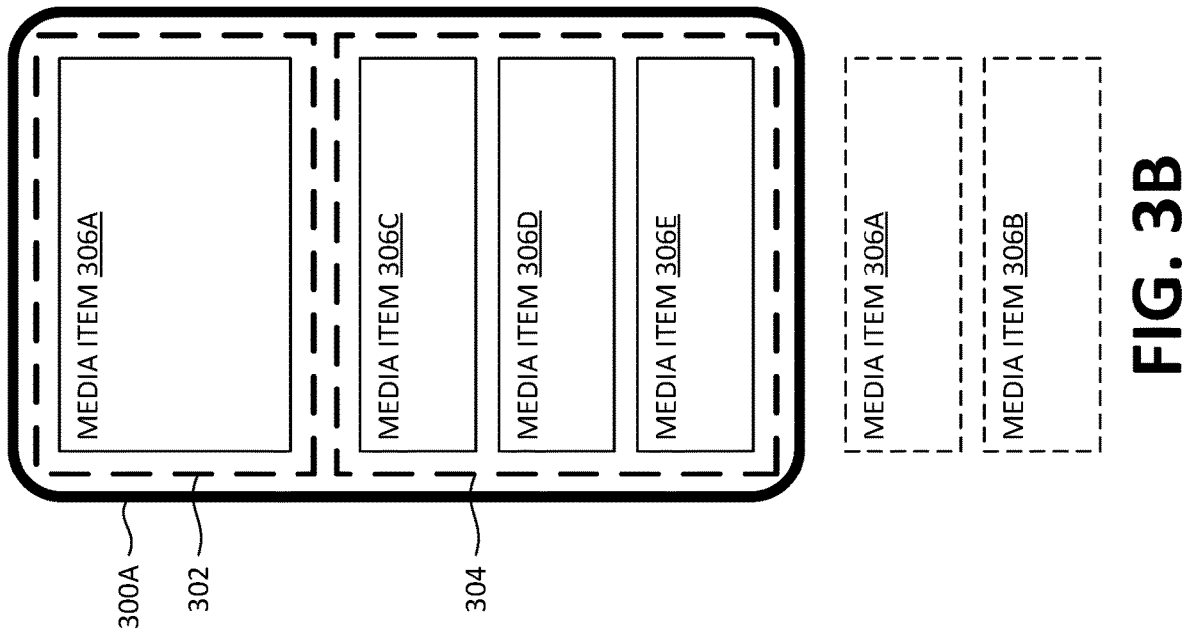
FIGS. 3A-D illustrate graphical user interfaces (GUIs) for example content viewers in accordance with at least one embodiment of the present disclosure.

In accordance with embodiments of the present disclosure, the platform UI may also include one or more scrollable UI elements (e.g., scrollable areas) that enable a user to browse or navigate one or more media items 121. A scrollable area contains one or media items 121 or other UI elements representing media items 121, and additional media items 121 may be appended to the scrollable area or may become visible in the scrollable area at a later time. For example, a scrollable area may contain one or more thumbnails representing available video recommendations, and more thumbnails may be automatically added to the scrollable area when more videos are available. The user may engage with the media items in the scrollable area using various gestures and other inputs. For example, a video may begin playing in place of its corresponding thumbnail in the scrollable area or in a separate viewer in a focus area when the user taps on the corresponding thumbnail. A scrollable area may only display a subset of available media items 121 (e.g., other media items 121 are hidden off-screen) and may provide a navigation experience to enable other media items 121 to become visible. For example, a scrollable area may respond to vertical or horizontal scrolling or swiping motions by visually scrolling through the available thumbnails, with thumbnails that were previously off-screen becoming visible. As an additional example, one or more thumbnails may initially be added to or stored in a buffer, index, or database on the client device and may become visible in the scrollable area in response to a user scrolling input. Further details regarding scrollable areas and focus areas are provided with respect to FIGS. 3A-B.

In accordance with embodiments of the present disclosure, the platform UI may also provide additional UI elements for presenting media items 121 that are not currently visible in the scrollable area, which may enable a user to more effectively discover hidden media items 121 and may improve the platform's ability to provide relevant media recommendations. The additional UI elements for presenting media items 121 may contribute to user curiosity and enjoyment and make users feel good while they are browsing available media items 121. The additional UI elements may be, for example, a collection of floatable elements representing media items 121, a collection of chip elements in a secondary scrollable area representing media items 121, or a combination of floatable elements and chip elements. The additional UI elements may be synchronized with the main scrollable area such that user interaction with one of the additional UI elements induces automatic navigation or activation of a media item 121 in the main scrollable area. The additional UI elements may be created or animated automatically in coordination with new media items 121 being added to the scrollable area or client device. This may provide an indication to the user that new media items 121 are being loaded off-screen and/or in the main scrollable area. Further details regarding the additional UI elements are provided with respect to FIGS. 4A-C and FIGS. 5A-C.

As illustrated in FIG. 1, platform 120 can include a media item backend engine 151. Media item backend engine 151 can be configured to provide (e.g., as recommendations or search results), based on various inputs, one or more media items to present to a user via a scrollable area. Media item backend engine 151 may consider various user-specific and generalized inputs when selecting media items to provide, such as the user's viewing and search history and preferences, current trends associated with multiple users or with platform 120, suggestions from advertising and other partners, and similar. Media item backend engine 151 may include a machine learning recommendation engine that receives the inputs described above and outputs one or more recommendations. Similarly, media item backend engine 151 may include a search engine that receives the inputs described above and outputs one or more search results. Media item backend engine 151 may provide new media items to be received by the user's device (e.g., client 102A) or by platform 120 when a scrollable area is initialized. A new scrollable area may be initialized, for example, when a user launches a content platform application on their mobile device or in a browser, or when the user initiates a search. The new media items may be requested by the user's device (e.g., client 102A) or by platform 120, for example, and may be used to populate the scrollable area. Additional media items may be later provided to add more content to the scrollable area.

In accordance with embodiments of the present disclosure, media item backend engine 151 may provide additional real-time recommendations or search results in response to user interaction with one or more secondary engagement UI elements. For example, a user tapping on a floatable element or chip element may trigger a new or updated recommendation, and the media item corresponding to the tapped floatable element or chip element may be included as input to media item backend engine 151 for generating the new or updated recommendation. Thus, the new or updated recommendation may more accurately reflect the user's current interests based on the user's current activity. The new or updated recommendation may provide new media items 121 to be added to the scrollable area or provide a reorganization of media items currently in the scrollable area. Reorganization of current media items may involve reordering the media items based on predicted user interest level or removing media items that are no longer relevant (e.g., the original recommendations have become stale). Further details regarding real-time recommendations or search results are provided with respect to FIG. 6.

It should be noted that although FIG. 1 illustrates media item backend engine 151 as part of platform 120, in additional or alternative embodiments, media item backend engine 151 can reside on one or more server machines that are remote from platform 120 (e.g., server machine 150 that can be part of a search platform or any other platform or service). In some embodiments, media item backend engine 151 can receive media item requests and inputs from client devices 102A-N or platform 120 (e.g., via network 108, via a bus, etc.) and similarly can provide media items to client devices 102A-N or platform 120.

It should be noted that in some other implementations, the functions of server machine 150 and/or platform 120 can be provided by a fewer number of machines. For example, in some implementations components and/or modules of server machine 150 may be integrated into a single machine, while in other implementations components and/or modules of server machine 150 may be integrated into multiple machines. In addition, in some implementations components and/or modules of server machine 150 may be integrated into platform 120.

In general, functions described in implementations as being performed by platform 120 and/or server machine 150 can also be performed on the client devices 102A-N in other implementations. In addition, the functionality attributed to a particular component can be performed by different or multiple components operating together. Platform 120 can also be accessed as a service provided to other systems or devices through appropriate application programming interfaces, and thus is not limited to use in websites.

Although implementations of the disclosure are discussed in terms of platform 120 and users of platform 120 accessing an electronic document, implementations can also be generally applied to any type of documents or files. Implementations of the disclosure are not limited to electronic document platforms that provide document creation, editing, and/or viewing tools to users. Further, implementations of the disclosure are not limited to text objects or drawing objects and can be applied to other types of objects.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline of platform 120.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2:
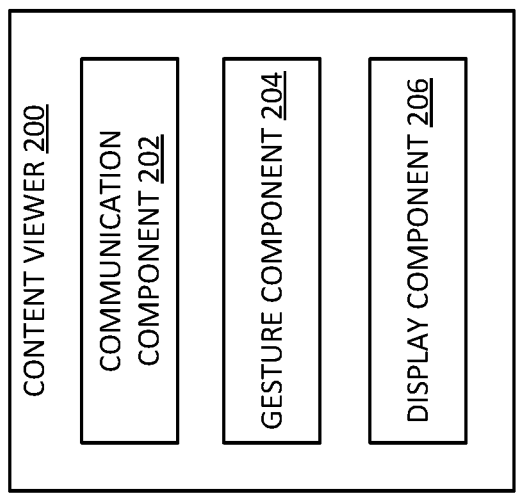
FIG. 2 illustrates an example content viewer that provides user experiences conducive to real-time media discovery, in accordance with at least one embodiment of the present disclosure.

FIG. 2 illustrates an example content viewer 200, which may be content viewer 104 of client devices 102A-N of FIG. 1, that provides user experiences conducive to discovery of an increased number of media items on user devices. Content viewer 200 may include a communication component 202, a gesture component 204, and a display component 206. In one implementation, communication component 202 may be configured to communicate with platform 120, server machine 150, and media item backend engine 151 to request and receive media items (e.g., media items 121) for display and viewing in a UI of content viewer 200.

In at least one embodiment, gesture component 204 may be configured to identify user inputs and determine different gestures for each user input. For example, gesture component 204 may recognize a touch input, such as a user's finger as proximate, or in contact with, a touch-sensitive surface of a display (e.g., a touchscreen) of client device 102A. Gesture component 204 may also be configured to associate different gestures from different users with different types of input. For example, user A may input a gesture that gesture component 204 determines is a tap gesture, whereas user B may input a similar gesture that gesture component 204 determines is a press-and-hold gesture. Different users may have different touch inputs that gesture component 204 may be configured to learn and use to differentiate between different intended gestures. In at least one embodiment, gesture component 204 may be configured to implement a machine learning model to differentiate between different types of user gestures from a user. In at least one embodiment, gesture component 204 may identify user input from connected devices. For example, gesture component 204 may identify clicking, scrolling, and dragging inputs from a connected mouse and keypress inputs from a connected keyboard.

In at least one embodiment, display component 206 is configured to render content for user interfaces on content viewer 200 including, but not limited to, a scrollable area with one or more media items and a focus area for presenting and/or playing a media item. For example, if a media item is initially loaded as a thumbnail of a video (an image with metadata such as title, author and/or other information about the video) or a portion (several frames) of a video, and gesture component 204 determines that the user selects this media item for playing, then communication component 202 may request and subsequently receive the video for the selected media item (e.g., a download or stream). The display component 206 may then present and play the video within the focus area on content viewer 200. Display component 206 may start playing the video automatically upon receiving the video and without any user input to request the playback. In another example, a media item may be loaded as an entire video, and when gesture component 204 determines that the user has selected this media item for playing, display component 206 may present and play the video within the focus area on content viewer 200. Display component 206 may start playing the video automatically (in response to or after a predefined time interval from user selection of the media item) and without any user input to request the playback.

FIGS. 3A-D illustrate graphical user interfaces (GUIs) for example content viewers 300A (FIGS. 3A-B) and 300B (FIGS. 3C-D) in accordance with at least one embodiment. Content viewer GUIs 300A-B may correspond to content viewer 104 of FIG. 1 and/or content viewer 200 of FIG. 2 in various embodiments, and as previously described may correspond to web browsers, mobile apps, desktop apps, TV apps, other applications, or components thereof. Content viewer GUIs 300A-B may contain various GUI elements such as buttons, text fields, media players, menus, labels, and similar. In at least one embodiment, content viewer GUIs 300A-B may contain more or fewer user GUI elements than those depicted in FIGS. 3A-D.

Figure 3A:
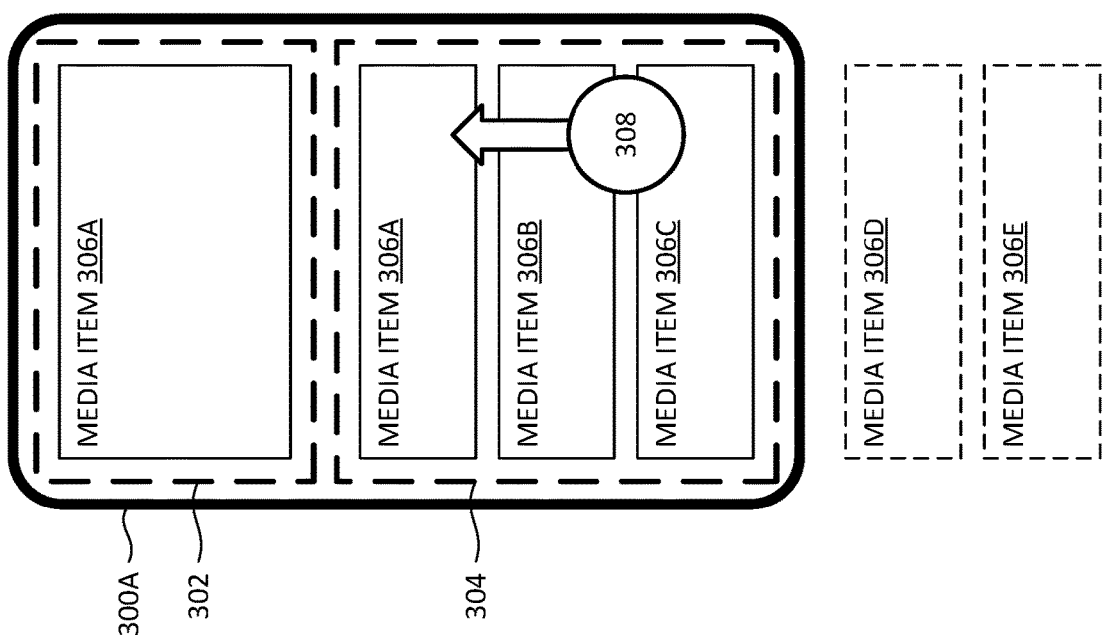
Figure 3D:
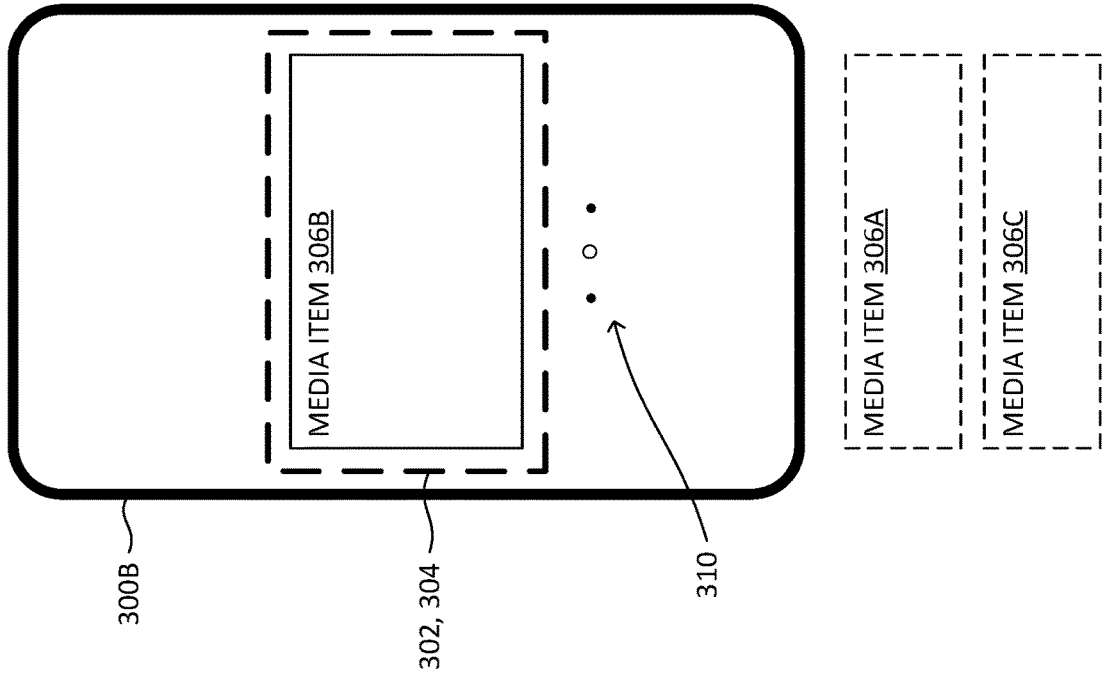

Referring to FIG. 3A, content viewer GUI 300A may include a focus area 302 and a scrollable area 304. Focus area 302 may present a media item, such as media item 306A. For example, focus area 302 may present a video item for playback, and may include GUI controls and indicators associated with playback as described with respect to FIG. 1 (e.g., play/pause button, next/previous buttons, timeline, etc.). Presenting a media item in focus area 302 may include fetching all or part of the media item from local memory or storage or from a remote location, such as platform 120. For example, a video item may be stored in full locally or may be streamed in segments from platform 120. In at least one embodiment, focus area 302 may present alternate content, no content, or may be removed from or minimized in the GUI if no media item has been activated for presentation in focus area 302.

Scrollable area 304 may present one or more media items or previews associated with media items, such as media items 306A-C. Examples of previews associated with media items may include video thumbnails, cover art or album art, channel or user art, media title, channel name, media description, animated GIFs or short video clips, combinations of these features, or other features. In at least one embodiment, one or more media items associated with scrollable area 304 may be visible to the user (e.g., media items 306A-C) and one or more media items associated with scrollable area 304 may not be visible to the user (e.g., media items 306D-E). For example, media items 306D-E may be stored off-screen in a buffer or index, or may be stored remotely (e.g., on platform 120) and retrieved prior to becoming visible.

Scrollable area 304 may be associated with a navigation experience. For example, a gesture component (e.g., gesture component 204 of FIG. 2) may receive user input indicating a desire to scroll scrollable area 304 to view additional media items. User input could be a swipe or drag motion on a touch screen or a scrolling motion on a mouse, for example. In FIG. 3A, user input 308 is an example of a vertical dragging motion over scrollable area 304. In response to user input 308, media items may become visible in scrollable area 304, may be removed from the visible portion of scrollable area 304, or may be moved within the visible portion of scrollable area 304. For example, in FIG. 3B, media item 306C has moved to the top of scrollable area 304, media items 306D-E have become visible in scrollable area 304, and media items 306A-B have been removed from the visible portion of scrollable area 304 (e.g., moved into a buffer or index, or removed from the device) in response to user input 308.

In at least one embodiment, a user may select a media item from scrollable area 304 to present in focus area 302. For example, a user may tap or click on media item 306A in scrollable area 304 to select it. The selected item may be removed from scrollable area 304 and transitioned into focus area 302, or it may remain in both scrollable area 304 and focus area 302 (e.g., media item 306A is present in both scrollable area 304 and focus area 302). The selected media item may be highlighted or animated in scrollable area 304 to indicate that it corresponds to the current media item in focus area 302. In at least one embodiment, user selection of a media item from scrollable area 304 may result in the media item automatically being played back in focus area 302.

Figure 3C:
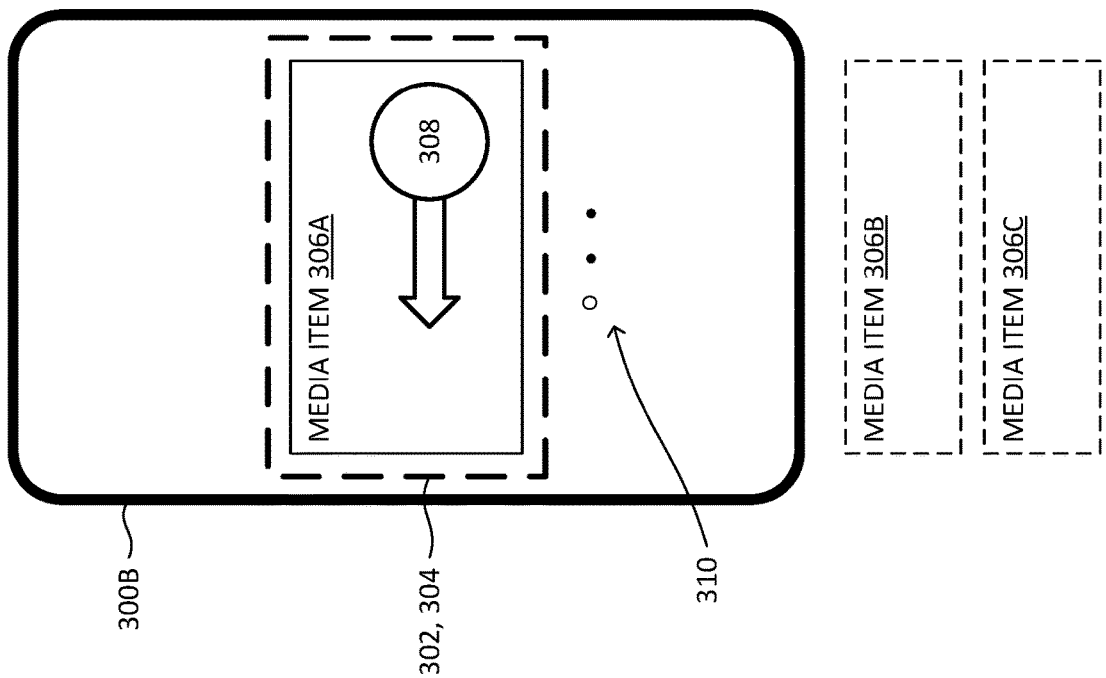

Referring to FIG. 3C and content viewer GUI 300B, focus area 302 and scrollable area 304 may be the same GUI element. For example, combined focus area and scrollable area 302, 304 may display only a single media item (e.g., media item 306A) while other media items are not visible and may provide controls and indicators for playing back the media item. In response to user scrolling input, combined focus area and scrollable area 302, 304 may remove the currently displayed media item and cause the next media item to become visible in its place. For example, media item 306A from FIG. 3C is removed from the visible area and media item 306B becomes visible in FIG. 3D in response to user input 308 (which is a horizontal gesture in FIG. 3C). In at least one embodiment, a content viewer GUI includes a navigation indicator (such as navigation indicator 310 in content viewer GUI 300B), which may animate in synchronization with navigation actions in scrollable area 304 and which may indicate to the user the position of the currently focused media item in relation to other available media items. For example, navigation indicator 310 indicates that a first media item in a sequence (e.g., media item 306A) is visible in combined focus area and scrollable area 302, 304 in FIG. 3C and that a second media item in a sequence (e.g., media item 306B) is visible in combined focus area and scrollable area 302, 304 in FIG. 3D.

Figure 4C:
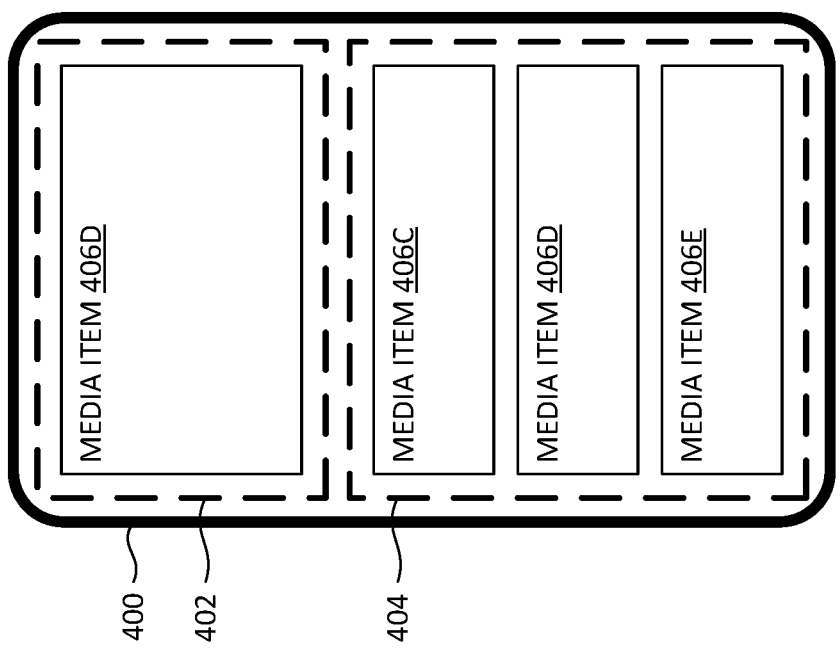

FIGS. 4A-C illustrate example content viewer GUI 400 with additional GUI elements to facilitate real-time media recommendation-friendly (or search result-friendly) user experiences, in accordance with at least one embodiment. Content viewer GUI 400 may correspond to component viewer GUIs 300A and/or 300B of FIGS. 3A-D. Likewise, focus area 402 may correspond to focus area 302, scrollable area 404 to scrollable area 304, and media items 406A-E to media items 306A-E. As described with respect to FIGS. 3A-B, media items 406D-E may not be initially visible in scrollable area 404 (e.g., see FIGS. 4A-B) but may become visible in scrollable area 404 at a subsequent time (e.g., see FIG. 4C).

In at least one embodiment, floatable elements 408A-C are presented in content viewer GUI 400, which may facilitate a real-time media recommendation-friendly (or search result-friendly) user experience. Floatable elements 408A-C may each correspond to a media item and display an icon representing the corresponding media item. For example, floatable element 408A may correspond to media item 406C (currently visible in scrollable area 404 in FIGS. 4A-B) and floatable elements 408B-C may correspond to media items 406D-E, respectively (currently not visible in scrollable area 404 in FIG. 4A-B). The icon representing the corresponding media item may be a thumbnail of the media item, a creator avatar, a channel icon, or similar. Floatable elements 408A-C may be of various shapes and sizes and may be larger than, smaller than, or the same size as the media items presented in focus area 402 and/or scrollable area 404. More or fewer floatable elements than depicted in FIGS. 4A-B may be presented.

Presentation of floatable elements 408A-C may be initiated in response to various events or may be initiated randomly. For example, new floatable elements may be presented for a new set of media items that have been loaded from the platform or provided by a media item backend engine. This may be useful for notifying users that new media items are available even if they are not yet visible in scrollable area 404, thus enabling users to more easily discover new content. Floatable elements 408A-C may be presented in response to detecting that the user has not engaged with the GUI for a period of time, which may aid in recapturing user attention.

In at least one embodiment, floatable elements 408A-C may be animated to transit along paths 410A-C across portions of content viewer GUI 400 from starting positions to ending positions, which may include transiting across portions of focus area 402 and/or scrollable area 404. Floatable elements 408A-C may be positioned in a foreground plane of content viewer GUI 400 such that they appear to float over focus area 402, scrollable area 404, media items 406A-C, and other GUI elements. Paths 410A-C may begin and end on- or off-screen and may overlap or intersect each other as well. While floatable elements 408A-C are depicted in FIGS. 4A-B as corresponding to unique paths 410A-C, floatable elements 408A-C may share one or more paths as well. Floatable elements 408A-C may transit along their respective paths at variable speeds and accelerations and may begin and end transiting at variable times. Floatable elements may animate in other ways during transit, which may draw the user's attention to specific floatable elements. For example, floatable elements may grow or shrink, rotate, change shape, change color or texture, flash, or similar.

In at least one embodiment, characteristics of the floatable elements may correspond to characteristics associated with media items. For example, the platform may determine based on output from the media item backend engine that the user is most likely to be interested in media item 406D, which the user has not yet discovered because it is not visible in scrollable area 404 of FIGS. 4A-B. Thus, floatable element 408B corresponding to media item 406D may have a different shape and larger size than other floatable elements and may display more animations to draw the attention of the user. In at least one embodiment, characteristics of the floatable elements may be chosen to draw attention to featured content, such as media items from sponsored content providers or advertising partners.

In at least one embodiment, user input associated with floatable elements 408A-C may cause activity in focus area 402 and/or scrollable area 404. For example, a user tapping or clicking on a floatable element may cause the corresponding media item to become visible in scrollable area 404 and/or automatically begin playback in focus area 402. If the user taps floatable element 408B in FIG. 4B for example, corresponding media item 406D is presented in focus area 402 in FIG. 4C and media item 406D becomes visible in scrollable area 404 as scrollable area 404 is automatically scrolled. Content viewer GUI 400 may communicate the user input to the platform and/or media item backend engine (e.g., via communication component 202 of FIG. 2), which may provide new or updated media items responsive to the user input. Media items may be reconfigured in scrollable area 404 (whether visible or not) to reflect the new or updated media items. One or more of floatable elements 408A-C may disappear in response to user input associated with any of floatable elements 408A-C, or floatable elements 408A-C may continue transiting to their respective ending positions.

Other user interactions with floatable elements may cause other activities. For example, a swipe-left gesture on a floatable element may indicate that the user is not interested in that media item. The floatable element may be removed from content viewer GUI 400 as a result. The user input may be further communicated to the platform or media item backend engine, which may recommend removing the corresponding media item and similar media items from scrollable area 404 as a result. A long press or right click on a floatable element may cause a context menu to appear (not depicted in FIGS. 4A-C), which may include actions such saving a media item to a playlist for later viewing or sharing the media item with a friend. A long press may also initiate a short preview of the media item in a floating media player (not depicted in FIGS. 4A-C).

Figure 5B:
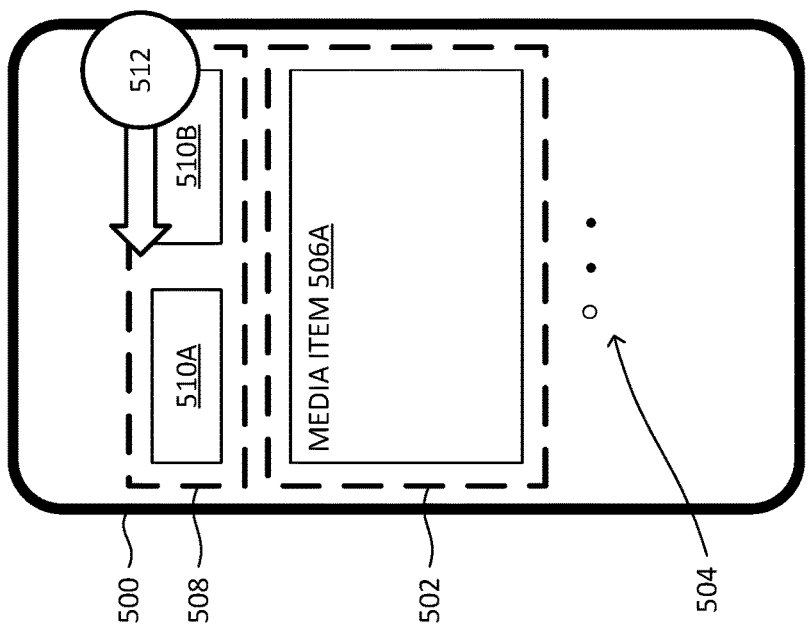
Figure 5B:
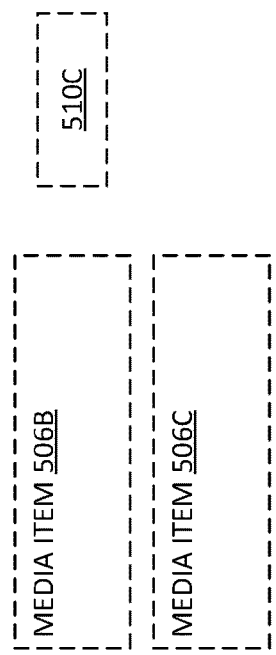
Figure 5A:
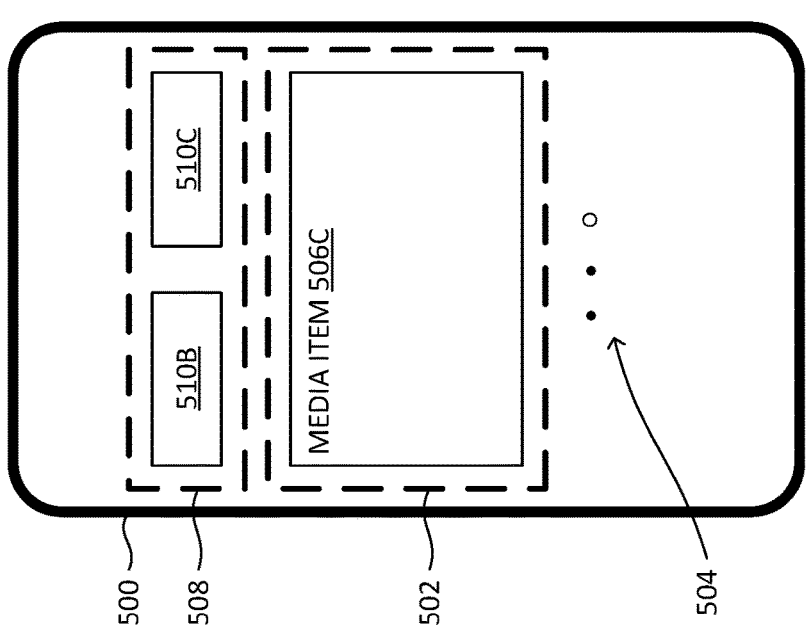
Figure 5A:
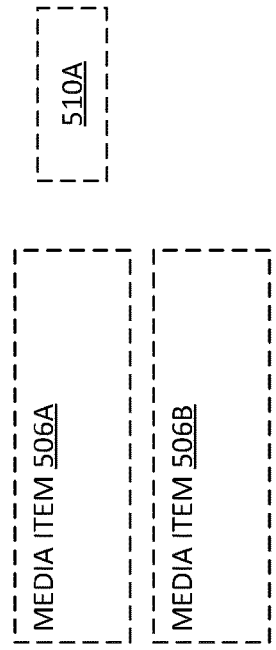

FIGS. 5A-B illustrate example content viewer GUI 500 with additional GUI elements to facilitate real-time media recommendation-friendly (or search result-friendly) user experiences, in accordance with at least one embodiment. Content viewer GUI 500 may correspond to component viewer GUIs 500A and/or 500B of FIGS. 3A-D. Likewise, combined focus area and scrollable area 502 may correspond to focus area 302 and/or scrollable area 304, navigation indicator 504 to navigation indicator 310, and media items 506A-C to media items 306A-C. As described with respect to FIGS. 3C-D, media items 506B-C may not be initially visible in combined focus area and scrollable area 502 (e.g., see FIG. 5A) but may become visible in combined focus area and scrollable area 502 at a subsequent time (e.g., see FIG. 5B).

In at least one embodiment, a scrollable chip shelf 508 is presented in content viewer GUI 500 and further includes chip elements 510A-C, which may facilitate a real-time media recommendation-friendly (or search result-friendly) user experience. Chip elements 510A-C may each correspond to a media item and display an icon representing the corresponding media item. For example, chip element 510A may correspond to media item 506A, 510B to 506B, 510C to 506C, and so on. The icon representing the corresponding media item may be a thumbnail of the media item, a creator avatar, a channel icon, or similar. Chip elements 510A-C may be larger than, smaller than, or the same size as media items presented in combined focus area and scrollable area 502. While chip elements 510A-C are depicted horizontally arranged in scrollable chip shelf 508 in FIGS. 5A-B, chip elements 510A-C may also be vertically arranged or arranged in another manner. In at least one embodiment, one or more chip elements associated with scrollable chip shelf 508 may be visible to the user (e.g., chip elements 510A-B in FIG. 5A) and one or more chip elements associated with scrollable chip shelf 508 may not be visible to the user (e.g., chip element 510C in FIG. 5A). For example, chip element 510C may be stored off-screen in a buffer or index, or may be stored remotely (e.g., on platform 120) and retrieved prior to becoming visible.

Scrollable chip shelf 508 may be associated with a navigation experience. For example, a gesture component (e.g., gesture component 204 of FIG. 2) may receive user input indicating a desire to scroll scrollable chip shelf 508 to view additional chip elements. User input could be a swipe or drag motion on a touch screen or a scrolling motion on a mouse, for example. In FIG. 5A, user input 512 is an example of a horizontal dragging motion over scrollable chip shelf 508. In response to user input 512, chip elements may become visible in scrollable chip shelf 508, may be removed from the visible portion of scrollable chip shelf 508, or may be moved within the visible portion of scrollable chip shelf 508. For example, in FIG. chip element 510B has moved to the left side of scrollable chip shelf 508, chip element 510C has become visible in scrollable chip shelf 508, and chip element 510A has been removed from the visible portion of scrollable chip shelf 508 (e.g., moved into a buffer or index, or removed from the device) in response to user input 512.

In at least one embodiment, chip elements 510A-C may be smaller than media items in combined focus area and scrollable area 502, enabling the user to scroll through chip elements more quickly with fewer gestures than are required for scrolling through media items in combined focus area and scrollable area 502. This may reduce user fatigue or boredom related to repetitive navigation and may enable the user to more quickly discover new content and recommendations.

In at least one embodiment, user input associated with chip elements 510A-C may cause activity in combined focus area and scrollable area 502. For example, a user tapping or clicking on a chip element may cause the corresponding media item to become visible in combined focus area and scrollable area 502 and automatically begin playback. Content viewer GUI 500 may communicate the user input to the platform and/or media item backend engine (e.g., via communication component 202 of FIG. 2), which may provide new or updated media items responsive to the user input. Media items may be reconfigured in combined focus area and scrollable area 502 (whether visible or not) to reflect the new or updated media items. In another example, navigation actions may be synchronized between combined focus area and scrollable area 502 and scrollable chip shelf 508. For example, user input 512 was previously described with respect to a scrolling action in scrollable chip shelf 508 in FIGS. 5A-B. Combined focus area and scrollable area 502 presents media item 506A in FIG. 5A but may automatically scroll to media item 506C in FIG. 5B to synchronize with the scrolling action in scrollable chip shelf 508 in response to user input 512.

Other user interactions with chip elements may cause other activities. For example, a swipe-up gesture on a chip element in horizontally arranged scrollable chip shelf may indicate that the user is not interested in that media item. The chip element may be removed from scrollable chip shelf 508 and the media item may be removed from combined focus area and scrollable area 502 as a result. The user input may be further communicated to the platform or media item backend engine, which may provide similar media items as a result. A long press or right click on a chip element may cause a context menu to appear (not depicted in FIGS. 5A-B), which may include actions such saving a media item to a playlist for later viewing or sharing the media item with a friend. A long press may also initiate a short preview of the media item in the chip element or in a floating media player (not depicted in FIGS. 5A-B).

In at least one embodiment, chip elements may be combined with floatable elements described with respect to FIGS. 4A-C. Referring to FIG. 5C, floatable elements 514A-C may correspond to floatable elements 408A-C of FIGS. 4A-B, and paths 516A-C may correspond to paths 410A-C. Floatable elements 514A-C may be positioned in a foreground plane of content viewer GUI 500 such that they appear to float over the GUI elements, including scrollable chip shelf 508 and chip elements 510A-C. Floatable elements 514A-C may have similar characteristics as those described with respect to FIGS. 4A-C, such as representative icons, variable shape, variable size, variable speed and acceleration, variable paths, and similar. In at least one embodiment, user input associated with floatable elements 514A-C may cause synchronized activity in combined focus area and scrollable area 502 and in scrollable chip shelf 508. For example, a user tapping or clicking on a floatable element may cause both scrollable areas to simultaneously scroll to the corresponding media item and chip element. Although FIGS. 5A-C depict content viewer GUI 500 as being similar to content viewer GUI 300B, scrollable chip shelf 408 with chip elements 510A-C may be similarly applied to content viewer GUI 300A or other content viewers, with or without floatable elements 514A-C.

Figure 6:
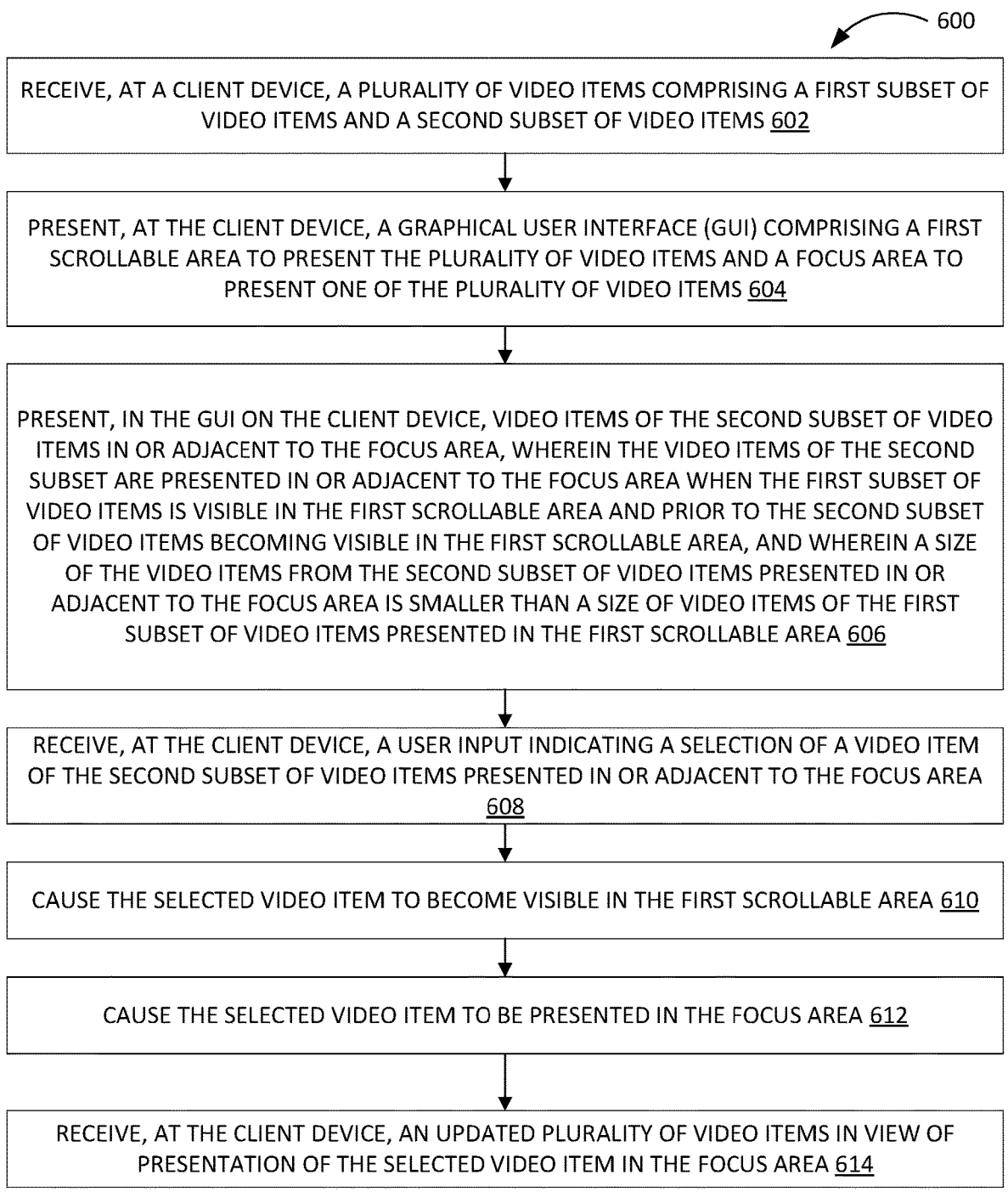
FIG. 6 depicts a flow diagram of an example method for providing real-time media discovery-friendly user experiences, in accordance with at least one embodiment of the present disclosure.

FIG. 6 is a flow diagram of an example method 600 for providing real-time media recommendation-friendly (or search result-friendly) user experiences, according to at least one embodiment. Method 600 can be performed by processing logic that can include hardware (circuitry, dedicated logic, etc.), software (e.g., instructions run on a processing device), or a combination thereof. In at least one implementation, some or all of the operations of method 600 can be performed by one or more components of system 100 of FIG. 1. In at least one embodiment, some or all of the operations of method 600 can be performed by a client device (e.g., client device 102A) or by software running on the client device, as described above.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

At block 602, processing logic provides, at a client device (e.g., a mobile device or any user device that may have a screen of a relatively small size), a plurality of video items comprising a first subset of video items and a second subset of video items. Videos and video items are used as an example in method 600 but may be substituted for other media items and media recommendations (or media search results) as described herein. Video items may be received from a remote location such as platform 120 or media item backend engine 151 of FIG. 1. Video items may also be received from local storage or memory. Receiving a video item may involve receiving metadata associated with a video, such as a unique identifier, title, description, recommendation score (e.g., the likelihood that this video will appeal to the user), and similar. Receiving a video item may also involve receiving all or part of a video, such as downloading or streaming portions of the video or receiving metadata associated with a location (e.g., a URL) from which to download or stream the video. The first and second subsets of video items may share one or more video items or may be mutually exclusive.

At block 604, processing logic presents, at the client device, a graphical user interface (GUI) comprising a first scrollable area to present the plurality of video items and a focus area to present one of the plurality of video items. For example, the graphical user interface may be one of content viewer GUIs 300A-B of FIGS. 3A-D or other content viewer GUIs. The first scrollable area may be scrollable area 304, and the focus area may be focus area 302. As described with respect to example content viewer 300B, the scrollable area and focus area may occupy the same portion of the GUI (e.g., combined focus area and scrollable area 302, 304).

At block 606, processing logic presents, in the GUI on the client device, video items of the second subset of video items in or adjacent to the focus area. The video items of the second subset of video items are presented in or adjacent to the focus area when the first subset of video items is visible in the first scrollable area and prior to the second subset of video items becoming visible in the first scrollable area. A size of the video items from the second subset of video items presented in or adjacent to the focus area is smaller than a size of video items of the first subset of video items presented in the first scrollable area.

In at least one embodiment, the video items from the second subset of video items are presented as floatable elements each comprising an icon representing a corresponding video item. The floatable elements may be floatable elements 408A-C of FIGS. 4A-B, for example. Each of the floatable elements may transit along a path across a portion of the focus area from a starting position to an ending position, as described with respect to FIGS. 4A-B. The icon representing the corresponding video item may be one of a video thumbnail, a creator avatar, or a channel icon. The floatable elements may each transit at a variable speed.

In at least one embodiment, the video items from the second subset of video items are presented as chip elements in a second scrollable area adjacent to the focus area, and each chip element comprises an icon representing a corresponding video item. For example, the second scrollable area may be scrollable chip shelf 508 of FIGS. 5A-C, and the chip elements may be chip elements 510A-C. The plurality of video items received in block 602 may be ordered using a first order and the chip elements may be presented in the second scrollable area in a second order. In at least one embodiment, the second order corresponds to the first order. In at least one embodiment, the second order does not correspond to the first order.

At block 608, processing logic receives, at the client device, a user input indicating a selection of a video item of the second subset of video items presented in or adjacent to the focus area. For example, user input may include gestures such as tapping, pressing, or swiping, or user input may be inputs from other devices such mice and keyboards. In at least one embodiment, the user input may be associated with floatable elements (e.g., floatable elements 408A-C), such as tapping on a floatable element. In at least one embodiment, the user input may be associated with chip elements (e.g., chip elements 510A-C), such as clicking on a chip element.

At block 610, processing logic causes the selected video item to become visible in the first scrollable area. Causing the selected video item to become visible in the first scrollable area may involve initiating automatic scrolling activity in the first scrollable area. The scrolling activity may be animated or may be instantaneous. If the selected video item was previously visible in the first scrollable area, processing logic may determine that no scrolling activity is necessary for the video item to become visible, or processing logic may initiate minor scrolling activity to, e.g., center the video item in the first scrollable area or move the video item to the top of the scrollable area.

At block 612, processing logic causes the selected video item to be presented in the focus area (e.g., focus area 302). As previously described with respect to FIGS. 3A-D, causing the video item to be presented in the focus area may entail loading the video from local storage or memory or streaming or downloading the video from a remote source. GUI elements may be provided in the focus area to enable the user to control playback of the video item. Processing logic may optionally cause the video item to begin playback automatically when presented in the focus area.

At block 614, processing logic receives, at the client device, an updated plurality of video items in view of presentation of the selected video item in the focus area. In particular, in some embodiments, processing logic provides a representation of the selected video item of the second subset of video items presented in or adjacent to the focus area as an input to a machine learning item engine. For example, processing logic at the client device may construct a message comprising metadata associated with the selected video, such as a unique identifier, title, or similar. The message may be sent to the platform or media item backend engine, which may provide the contents of the message as input to the machine learning engine to generate new items. In another example, processing logic at the client device may interact with an application programming interface (API) provided by the platform or media item backend engine and provide metadata associated with the selected video through the API. The API may be a REST API for example. Subsequently, processing logic can receive an updated plurality of video items associated with an output of the machine learning item engine. In at least one embodiment, the updated plurality of video items may be new video items not previously received at the client device. The new video items may be provided from the platform or media item backend in response to perceived changes in the user's interests based on the selected video item in block 608. The new video items may be placed in a scrollable area (e.g., scrollable area 304) or may become visible in a scrollable area at a later time. The new video items may also be stored in a buffer or index in the device, for example.

In at least one embodiment, the updated plurality of video items may be a reorganization of video items previously received at the device. For example, the platform or media item backend may determine in response to the user selecting a video item in block 608 that one or more of the original video items may be stale or no longer relevant to the user's current interests. The updated items may include removing stale items, adding new items, or rearranging the order in which the items are presented to the user in a scrollable area.

In at least one embodiment, processing logic may initiate a notification animation associated with chip elements (e.g., chip elements 510A-C) in response to receiving the updated plurality of video items, which may draw the user's attention to the new updates. For example, chip elements may grow or shrink, rotate, change shape, change color or texture, flash, or similar. A notification animation may be initiated with respect to other GUI elements as well, such as navigation indicator 504.

Figure 7:
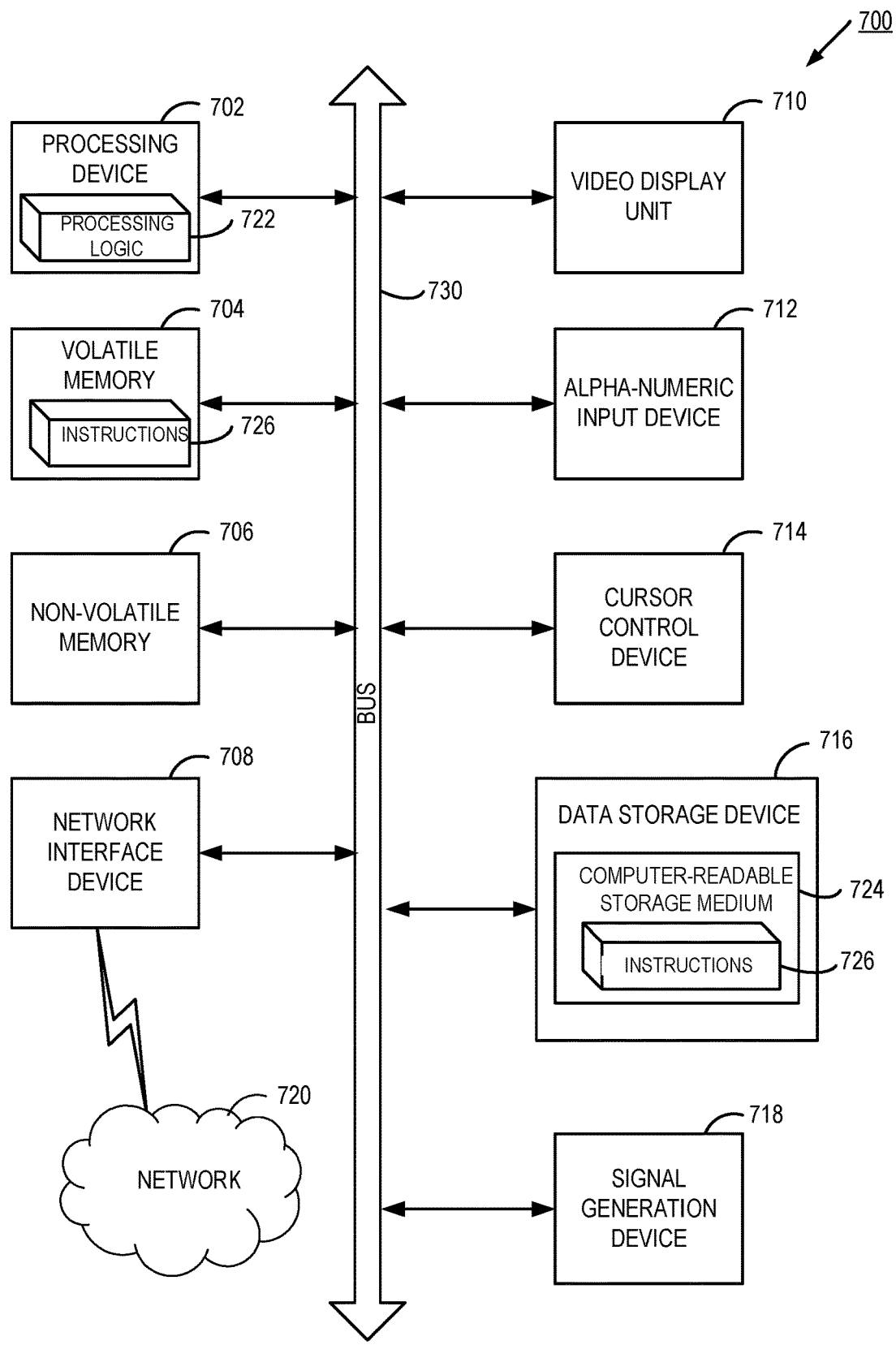
FIG. 7 is a block diagram illustrating an exemplary computer system, in accordance with at least one embodiment of the present disclosure.

FIG. 7 is a block diagram illustrating an exemplary computer system 700, in accordance with implementations of the present disclosure. The computer system 700 can correspond to platform 120 and/or client devices 102A-N, described with respect to FIG. 1. Computer system 700 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 718, which communicate with each other via a bus 740.

Processor (processing device) 702 represents one or more general-purpose processing devices such as a microprocessor, central processing unit, or the like. More particularly, the processor 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 can also be one or more special-purpose processing devices such as an application specific integrated circuit (ASIC), a field programmable gate array (FPGA), a digital signal processor (DSP), network processor, or the like. The processor 702 is configured to execute instructions 705 (e.g., for providing real-time video recommendation-friendly user experiences and systems) for performing the operations discussed herein.

The computer system 700 can further include a network interface device 708. The computer system 700 also can include a video display unit 710 (e.g., a liquid crystal display (LCD) or a cathode ray tube (CRT)), an input device 712 (e.g., a keyboard, and alphanumeric keyboard, a motion sensing input device, touch screen), a cursor control device 714 (e.g., a mouse), and a signal generation device 720 (e.g., a speaker).

The data storage device 718 can include a non-transitory machine-readable storage medium 724 (also computer-readable storage medium) on which is stored one or more sets of instructions 705 (e.g., for providing real-time video recommendation-friendly user experiences and systems) embodying any one or more of the methodologies or functions described herein. The instructions can also reside, completely or at least partially, within the main memory 704 and/or within the processor 702 during execution thereof by the computer system 700, the main memory 704 and the processor 702 also constituting machine-readable storage media. The instructions can further be transmitted or received over a network 730 via the network interface device 708.

In one implementation, the instructions 705 include instructions for providing real-time video recommendation-friendly user experiences and systems. While the computer-readable storage medium 724 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
   receiving, at a client device, a plurality of video items comprising a first subset of video items and a second subset of video items;
   presenting, at the client device, a graphical user interface (GUI) comprising a first scrollable area to present the plurality of video items and a focus area to present one of the plurality of video items; and
   presenting, in the GUI on the client device, video items of the second subset of video items in or adjacent to the focus area in a first size,
   wherein the video items of the second subset of video items are presented in or adjacent to the focus area in the first size when the first subset of video items is visible in the first scrollable area in a second size and prior to a scrolling request of a user of the client device to cause the second subset of video items to become visible in the first scrollable area in the second size, and
   wherein the first size of the video items from the second subset of video items presented in or adjacent to the focus area is smaller than the second size of video items of the first subset of video items presented in the first scrollable area.

2. The method of claim 1, wherein the video items from the second subset of video items are presented as floatable elements each comprising an icon representing a corresponding video item.

3. The method of claim 2, wherein each floatable element transits along a path across a portion of the focus area from a starting position to an ending position.

4. The method of claim 2, wherein the icon representing the corresponding video item is one of a video thumbnail, a creator avatar, or a channel icon, and wherein the floatable elements each transit at a variable speed.

5. The method of claim 1, wherein the video items from the second subset of video items are presented as chip elements in a second scrollable area adjacent to the focus area, and wherein each chip element comprises an icon representing a corresponding video item.

6. The method of claim 5, wherein the plurality of video items are ordered using a first order, wherein the chip elements are presented in the second scrollable area in a second order, and wherein the second order corresponds to the first order.

7. The method of claim 5, further comprising:
   receiving, at the client device, an updated plurality of video items; and
   initiating a notification animation associated with the chip elements.

8. The method of claim 1, further comprising:
   receiving, at the client device, a user input indicating a selection of a video item of the second subset of video items presented in or adjacent to the focus area;
   causing the selected video item to become visible in the first scrollable area; and
   causing the selected video item to be presented in the focus area.

9. A system comprising:
   a memory device; and
   a processing device coupled to the memory device, the processing device to perform operations comprising:
   receiving, at a client device, a plurality of video items comprising a first subset of video items and a second subset of video items;
   presenting, at the client device, a graphical user interface (GUI) comprising a first scrollable area to present the plurality of video items and a focus area to present one of the plurality of video items; and
   presenting, in the GUI on the client device, video items of the second subset of video items in or adjacent to the focus area in a first size,
   wherein the video items of the second subset of video items are presented in or adjacent to the focus area in the first size when the first subset of video items is visible in the first scrollable area in a second size and prior to a scrolling request of a user of the client device to cause the second subset of video items to become visible in the first scrollable area in the second size, and
   wherein the first size of the video items from the second subset of video items presented in or adjacent to the focus area is smaller than the second size of video items of the first subset of video items presented in the first scrollable area.

10. The system of claim 9, wherein the video items from the second subset of video items are presented as floatable elements each comprising an icon representing a corresponding video item.

11. The system of claim 10, wherein each floatable element transits along a path across a portion of the focus area from a starting position to an ending position.

12. The system of claim 10, wherein the icon representing the corresponding video item is one of a video thumbnail, a creator avatar, or a channel icon, and wherein the floatable elements each transit at a variable speed.

13. The system of claim 9, wherein the video items from the second subset of video items are presented as chip elements in a second scrollable area adjacent to the focus area, and wherein each chip element comprises an icon representing a corresponding video item.

14. The system of claim 13, wherein the plurality of video items are ordered using a first order, wherein the chip elements are presented in the second scrollable area in a second order, and wherein the second order corresponds to the first order.

15. The system of claim 13, the operations further comprising:
  receiving, at the client device, an updated plurality of video items; and
  initiating a notification animation associated with the chip elements.

16. The system of claim 9, the operations further comprising:
  receiving, at the client device, a user input indicating a selection of a video item of the second subset of video items presented in or adjacent to the focus area;
  causing the selected video item to become visible in the first scrollable area; and
  causing the selected video item to be presented in the focus area.

17. A non-transitory computer-readable medium comprising instructions that, when executed by a processing device, cause the processing device to perform operations comprising:
  receiving, at a client device, a plurality of video items comprising a first subset of video items and a second subset of video items;
  presenting, at the client device, a graphical user interface (GUI) comprising a first scrollable area to present the plurality of video items and a focus area to present one of the plurality of video items; and
  presenting, in the GUI on the client device, video items of the second subset of video items in or adjacent to the focus area in a first size,
  wherein the video items of the second subset of video items are presented in or adjacent to the focus area in the first size when the first subset of video items is visible in the first scrollable area in a second size and prior to a scrolling request of a user of the client device to cause the second subset of video items to become visible in the first scrollable area in the second size, and
  wherein the first size of the video items from the second subset of video items presented in or adjacent to the focus area is smaller than the second size of video items of the first subset of video items presented in the first scrollable area.

18. The non-transitory computer-readable medium of claim 17, wherein the video items from the second subset of video items are presented as floatable elements each comprising an icon representing a corresponding video item.

19. The non-transitory computer-readable medium of claim 18, wherein each floatable element transits along a path across a portion of the focus area from a starting position to an ending position.

20. The non-transitory computer-readable medium of claim 18, wherein the icon representing the corresponding video item is one of a video thumbnail, a creator avatar, or a channel icon, and wherein the floatable elements each transit at a variable speed.

21. The non-transitory computer-readable medium of claim 17, wherein the video items from the second subset of video items are presented as chip elements in a second scrollable area adjacent to the focus area, and wherein each chip element comprises an icon representing a corresponding video item.

22. The non-transitory computer-readable medium of claim 21, wherein the plurality of video items are ordered using a first order, wherein the chip elements are presented in the second scrollable area in a second order, and wherein the second order corresponds to the first order.

23. The non-transitory computer-readable medium of claim 21, the operations further comprising:
  receiving, at the client device, an updated plurality of video items; and
  initiating a notification animation associated with the chip elements.

24. The non-transitory computer-readable medium of claim 17, the operations further comprising:
  receiving, at the client device, a user input indicating a selection of a video item of the second subset of video items presented in or adjacent to the focus area;
  causing the selected video item to become visible in the first scrollable area; and
  causing the selected video item to be presented in the focus area.

* * * * *